C. GALLUS.
RECEPTACLE FOR STORAGE BATTERIES.
APPLICATION FILED JAN. 25, 1921.

1,402,591.

Patented Jan. 3, 1922.

Charles Gallus.
INVENTOR

BY *Victor J. Evans*
ATTORNEY

WITNESS:

UNITED STATES PATENT OFFICE.

CHARLES GALLUS, OF PHILADELPHIA, PENNSYLVANIA.

RECEPTACLE FOR STORAGE BATTERIES.

1,402,591.  Specification of Letters Patent.  Patented Jan. 3, 1922.

Application filed January 25, 1921. Serial No. 439,886.

*To all whom it may concern:*

Be it known that I, CHARLES GALLUS, a citizen of the United States, residing at Philadelphia, in the county of Philadelphia and State of Pennsylvania, have invented new and useful Improvements in Receptacles for Storage Batteries, of which the following is a specification.

This invention relates to storage or secondary batteries and it has more particular reference to that type or form thereof which is intended for use with a liquid electrolyte, the main object being to provide a novel form of jar or receptacle for said electrolyte which is practically indestructible; in other words I aim to provide a jar or cell for secondary or storage batteries which resists tendencies to bulging while at the same time it is substantially unbreakable if dropped or otherwise subjected to injurious action.

Another object of this invention is to provide a receptacle or jar for storage batteries using a liquid electrolyte which will not crack under expansion or contraction such as when batteries of the type referred to get overheated or become frozen.

With the foregoing objects in view this invention consists essentially in forming the jar or cell for wet batteries from rubber or similar material having a degree of resiliency sufficient to accommodate the changes in cubic content of the electrolyte incident to different temperature changes.

In the further disclosure of the invention reference is to be had to the accompanying drawing constituting a part of this specification, and in which like characters of reference designate the same parts in both the views.

Figure 1:
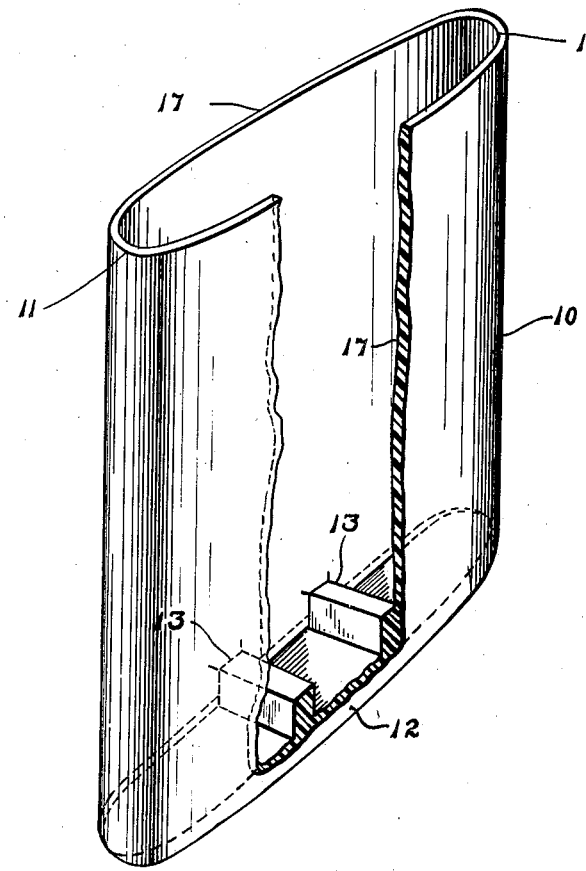
Figure 2:
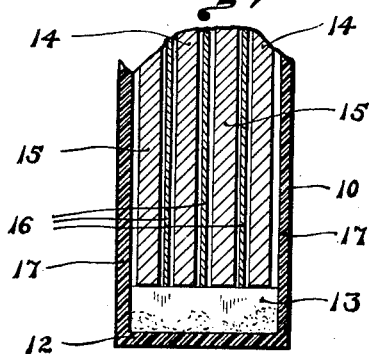

Figure 1— is a perspective view of a convenient form of jar or cell for a liquid storage battery and embodying my invention; and, Figure 2— is a fragmentary vertical sectional view of the same with the anodes and cathodes in position.

Referring to the drawings the numeral 10 designates the improved jar or receptacle generally and it is to be noted that it is preferably made or moulded from rubber having a sufficient degree of inherent and constant resiliency that remains unaffected by changes in temperature, and said jar or receptacle is conveniently elongated in cross section as shown to provide rounded ends 11, 11 and a correspondingly shaped base or bottom 12. Transversely of the base or bottom 12 there is provided rectangular shaped plate supports or ribs 13 which may be formed integral therewith, or they may be of a harder nature than the main or body portion and vulcanized therein in the well known ways. These ribs 13 serve to support the anodes 14, and cathodes 15 which are spaced by separator elements 16 of appropriate material, and it is to be remarked that they also tend to maintain the side walls 17 in spaced relation as will be obvious to those skilled in the art to which this invention appertains.

From the foregoing it will be clearly seen that by my invention I provide a novel and serviceable jar or receptacle for storage batteries which accommodates itself to any expansion or contraction of the electrolyte contained therein, while it will not break or easily become damaged if accidentally dropped or otherwise subjected to ill usage.

Having described my invention what I claim as new and desire to secure by Letters Patent is:—

1. As a new article of manufacture, a receptacle for storage batteries composed wholly of rubber having a constant degree of resiliency and comprising an oval shaped bottom, vertical side members extending therefrom and curved end members connecting said side members and a pair of spaced rectangular shaped transverse ribs composed wholly of non-yielding material secured to the bottom and side members of said receptacle.

2. A device of the class described comprising a receptacle composed wholly of rubber having a constant degree of resiliency and a pair of spaced rectangular shaped ribs composed wholly of non-yielding material and secured to the bottom and side walls of said receptacle, a plurality of anodes located within said receptacle and engaging said ribs, a plurality of cathodes located within said receptacle and engaging said ribs, and a plurality of separator elements located in said receptacle between said cathodes and anodes.

In testimony whereof I affix my signature.

CHARLES GALLUS.